United States Patent
Kim et al.

(10) Patent No.: US 8,923,644 B2
(45) Date of Patent: Dec. 30, 2014

(54) IMAGE PROCESSING APPARATUS AND SYSTEMS USING ESTIMATED POINT SPREAD FUNCTION

(75) Inventors: Tae-chan Kim, Yongin-si (KR); Joon-ki Paik, Seoul (KR); Sang-hoon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 473 days.

(21) Appl. No.: 13/074,180

(22) Filed: Mar. 29, 2011

(65) Prior Publication Data
US 2011/0234610 A1    Sep. 29, 2011

(30) Foreign Application Priority Data

Mar. 29, 2010    (KR) .................. 10-2010-0028087

(51) Int. Cl.
G06K 9/40    (2006.01)
G06T 5/00    (2006.01)

(52) U.S. Cl.
CPC .................... G06T 5/003 (2013.01)
USPC ............................ 382/255; 348/345; 348/354

(58) Field of Classification Search
CPC ........................................ G06T 5/003
USPC ........................................ 382/255
See application file for complete search history.

(56) References Cited

U.S. PATENT DOCUMENTS

| 6,154,574 | A  * | 11/2000 | Paik et al. ...................... 382/255 |
| 6,886,153 | B1 * | 4/2005 | Bevis ............................... 716/51 |
| 7,237,721 | B2 * | 7/2007 | Bilcu et al. ...................... 235/454 |
| 8,090,212 | B1 * | 1/2012 | Baxansky et al. ............. 382/260 |
| 8,098,948 | B1 * | 1/2012 | Tzur et al. ...................... 382/255 |
| 8,115,840 | B2 * | 2/2012 | Litvinov et al. ............... 348/280 |
| 8,139,886 | B2 * | 3/2012 | Szeliski et al. ................ 382/260 |
| 8,249,357 | B2 * | 8/2012 | Yitzhaky et al. .............. 382/199 |
| 8,339,481 | B2 * | 12/2012 | Kim et al. ...................... 348/241 |
| 8,345,945 | B2 * | 1/2013 | Song et al. ..................... 382/131 |
| 8,582,911 | B2 * | 11/2013 | Kim et al. ...................... 382/260 |
| 8,737,761 | B2 * | 5/2014 | Zhang et al. ................... 382/264 |
| 2005/0276513 | A1 * | 12/2005 | Ojanen et al. ................. 382/286 |

(Continued)

FOREIGN PATENT DOCUMENTS

| JP | 2007-072558 | 3/2007 |
| KR | 10 2005 0107741 A | 11/2005 |
| KR | 10 2008 0048220 A | 6/2008 |

OTHER PUBLICATIONS

Joon Shik Yoon, et al., "Out-of-Focus Blur Estimation Using Isotropic Step Responses and Its Application to Image Restoration", 2000, Visual Communications and Image Processing, Proceedings of SPIE vol. 4067.*
Joon Shik Yoon, et al., "Enhancement of Out-of-Focused Images Using Fusion-Based PSF Estimation and Restoration", 2001, In proceeding of: Visual Communications and Image Processing, p. 1-11.*

*Primary Examiner* — Gandhi Thirugnanam
(74) *Attorney, Agent, or Firm* — Myers Bigel Sibley & Sajovec, P.A.

(57) ABSTRACT

An image processing apparatus includes a point spread function (PSF) pattern generation unit for generating a PSF pattern in which a plurality of PSFs are located in a plurality of lines of the PSF pattern; a PSF estimation unit for estimating PSFs of an out-of-focus input image from step responses of the plurality of lines of the PSF pattern with respect to an edge of the out-of-focus input image; and an image restoration unit for restoring the out-of-focus input image to a focused restored image using the estimated PSF.

8 Claims, 8 Drawing Sheets

(56) References Cited

U.S. PATENT DOCUMENTS

| | | | |
|---|---|---|---|
| 2006/0266836 A1* | 11/2006 | Bilcu et al. | 235/462.16 |
| 2008/0239088 A1* | 10/2008 | Yamashita | 348/222.1 |
| 2010/0271495 A1* | 10/2010 | Tamura | 348/208.4 |
| 2011/0234610 A1* | 9/2011 | Kim et al. | 345/581 |
| 2012/0112095 A1* | 5/2012 | Baer | 250/459.1 |
| 2012/0314198 A1* | 12/2012 | Lee et al. | 355/77 |
| 2013/0301896 A1* | 11/2013 | Vija et al. | 382/131 |
| 2013/0308842 A1* | 11/2013 | Blanchard et al. | 382/128 |

* cited by examiner

GENERATE PSF PATTERN:

$i^2 + j^2 = k^2 \rightarrow h(i,j) = r(k)$ $(k-1)^2 < i^2 + j^2 < k^2 \rightarrow h(i,j) = \frac{1}{2}\{r(k) + r(k-1)\}$

ESTIMATE PSF:

① OBTAIN STEP RESPONSE WITH RESPECT TO VERTICAL LINES OF THE PSF PATTERN
② CALCULATE INTENSITIES OF CENTER CIRCLES
③ CALCULATE PSF ESTIMATION VALUE

RESTORE IMAGES

|         | r(0) | r(1) | r(2) | r(3) | r(4) | r(5) |
|---------|------|------|------|------|------|------|
| sr(J)   | 0    | 0    | 0    | 0    | 0    | 0    |
| sr(J+1) | 0    | 0    | 0    | 0    | 3    | 5    |
| sr(J+2) | 0    | 0    | 0    | 3    | 6    | 8    |
| sr(J+3) | 0    | 0    | 3    | 6    | 8    | 9    |
| sr(J+4) | 0    | 2    | 5    | 8    | 10   | 10   |
| sr(J+5) | 1    | 4    | 7    | 10   | 12   | 12   |
| sr(J+6) | 1    | 6    | 9    | 12   | 14   | 13   |
| sr(J+7) | 1    | 6    | 12   | 15   | 16   | 14   |
| sr(J+8) | 1    | 6    | 12   | 18   | 19   | 17   |
| sr(J+9) | 1    | 6    | 12   | 18   | 22   | 21   |
| sr(J+10)| 1    | 6    | 12   | 18   | 22   | 22   |

IMAGE PROCESSING APPARATUS AND SYSTEMS USING ESTIMATED POINT SPREAD FUNCTION

CROSS-REFERENCE TO RELATED APPLICATIONS

This application claims the benefit of Korean Patent Application No. 10-2010-0028087, filed on Mar. 29, 2010, in the Korean Intellectual Property Office, the disclosure of which is incorporated herein in its entirety by reference.

BACKGROUND

The inventive concept relates to an image processing apparatus and image processing methods, and more particularly, to an image processing apparatus and image processing method for estimating a point spread function (PSF) and performing image restoration using the estimated PSF, thereby increasing image quality. If an image is determined to be out-of-focus or blurred by estimating a PSF, digital autofocusing is performed by compensating for the out-of-focus or blurring problem.

SUMMARY

The inventive concept provides an image processing apparatus and image processing method for estimating a point spread function (PSF) and performing image restoration using the estimated PSF, thereby increasing image quality.

According to some embodiments of the inventive concept, there is provided a image processing apparatus that includes a point spread function (PSF) pattern generation unit that is configured to generate a PSF pattern in which multiple PSFs are located in multiple lines of the PSF pattern, a PSF estimation unit that is configured to estimate at least one of the PSFs of an out-of-focus input image from at least one of multiple step responses of respective ones of the lines of the PSF pattern with respect to an edge of the out-of-focus input image and an image restoration unit that is configured to restore the out-of-focus input image to a focused restored image using the estimated PSF.

In some embodiments, the PSF pattern includes a center point and multiple center circles and the PSFs are located at a lattice point where multiple horizontal lines and multiple vertical lines are located inside an outermost center circle among the center circles. Some embodiments provide that the PSF pattern includes the PSFs arranged diagonal to each other in four directions with respect to a centered horizontal line among the horizontal lines and a centered vertical line among the vertical lines.

In some embodiments, the PSF estimation unit is configured to determine step responses of vertical lines of the PSF pattern with respect to a vertically oriented edge of the out-of-focus input image. Some embodiments provide that the PSF estimation unit includes a step response calculation unit that is configured to performing image convolution on the edge of the out-of-focus input image and each line of the PSF pattern and to calculate the step responses including an intensity of the center point and/or intensities of the center circles as factors. Some embodiments include an intensity calculation unit that is configured to determine the intensities of the center point and the center circles of the PSF pattern from the step responses and a PSF estimation value calculation unit that is configured to calculate estimation values of the PSFs belonging to the PSF pattern from the intensities of the center point and the center circles calculated by the intensity calculation unit.

In some embodiments, the step responses are determined by using the intensity of the center point and/or intensities of the center circles as factors if the PSFs are located in the center point and/or the center circles, and by using an intensity of an adjacent center point and/or intensities of multiple adjacent center circles as factors, if the PSFs are not located in the center point and/or the center circles. Some embodiments provide that responsive to a matrix A having factors corresponding to the intensity of the center point and/or the intensities of the center circles of each of the step responses for lines of the PSF pattern in a direction, a vector for the intensities of the center point and the center circles is r, and a vector for the step responses is s, the intensity calculation unit calculates the intensities of the center point and the center circles according to an equation $Ar=s$. In some embodiments, the intensity calculation unit determines a pseudo inverse matrix $A^+$ with respect to the matrix A, and calculates the intensities of the center point and the center circles according to an equation $r=A^+s$.

Some embodiments provide that if the PSFs are located in the center point or the center circles, the PSF estimation calculation unit estimates the intensity of the center point and/or the intensities of the center circles as the corresponding PSF, and, if the PSFs are not located in the center point or the plurality of center circles, the PSF estimation calculation unit estimates the average value of the intensities of an adjacent center point or adjacent center circles as the corresponding PSF.

Some embodiments provide that the image restoration unit de-convolutes the out-of-focus input image and the estimated PSF and performs digital focus correction on the out-of-focus input image.

Some embodiments of the present invention include an image system that includes an imaging device that is configured to capture an image of an object through a lens, and generate an image signal of the captured image, an image processing apparatus that is configured to receive the image signal from the imaging device and to process the image signal, and a display unit that is configured to display the processed image signal. In some embodiments, the image processing apparatus includes a PSF pattern generation unit that is configured to generate a PSF pattern in which multiple PSFs are located in multiple lines of the PSF pattern, a PSF estimation unit that is configured to estimate PSFs of an out-of-focus input image from step responses of the lines of the PSF pattern with respect to an edge of the out-of-focus input image, and an image restoration unit that is configured to restore the out-of-focus input image to a focused restored image using the estimated PSF.

Some embodiments of the present invention include an image processing method performed in an image processing apparatus. Operations according to such methods may include generating a point spread function (PSF) pattern that includes multiple PSFs that correspond to intersections of multiple vertical lines and multiple horizontal lines, estimating multiple step responses that correspond to the vertical lines of the PSF pattern with respect to a vertically oriented edge of an out of focus image, and estimating the intensities of the center point and the center circles of the PSF pattern from the step responses. Operations may include calculating a PSF estimate value of the out-of-focus input image from the step responses of the vertical lines of the PSF pattern with respect to an edge of the out-of-focus input image. Some embodiments provide that the generating, estimating and/or calculating operations are performed using at least one data processor.

In some embodiments, the PSF pattern includes a center point and multiple center circles and the PSFs are located inside an outermost center circle among the center circles. Some embodiments provide include, before estimating ones of the step responses, performing image convolution on the edge of the out-of-focus input image and each vertical line of the PSF pattern. Some embodiments provide that, if the PSFs are located at the center point or in the center circles, the step responses are determined using an intensity of the center point and/or intensities of ones of the center circles as factors. Some embodiments provide that, if the PSFs are not located at the center point or in the center circles, the step responses are determined using an intensity of an adjacent center point and/or intensities of ones of multiple adjacent center circles as factors.

In some embodiments, calculating the PSF estimate includes performing image convolution on the edge of the out-of-focus input image and each line of the PSF pattern and calculating the step responses including an intensity of the center point or intensities of the center circles as factors, and determining the intensities of the center point and the center circles of the PSF pattern from the step responses.

Some embodiments provide that a matrix A includes factors corresponding to the intensity of the center point or the intensities of the center circles of each of the step responses for lines of the PSF pattern, a vector r corresponds to the intensities of the center point and the center circles, a vector s corresponds to the step responses, and the intensities are determined using an equation $Ar=s$. In some embodiments, determining the intensities includes obtaining a pseudo inverse matrix $A^+$ with respect to the matrix A, and calculating the intensities of the center point and the center circles according to an equation $r=A^+s$.

Some embodiments include restoring the out-of-focus input image to a focused image using the estimated PSF estimate. In some embodiments, restoring the out-of-focus input image includes de-convoluting the out-of-focus input image and the estimated PSF and performing digital focus correction on the out-of-focus input image.

Some embodiments of the present invention include an image processing method performed in an image processing apparatus. Operations according to such methods include generating a PSF pattern in which multiple PSFs are located in multiple lines, estimating a PSF of an out-of-focus input image from step responses of the lines of the PSF pattern with respect to an edge of the out-of-focus input image, and restoring the out-of-focus input image to a focused image by using the estimated PSF.

In some embodiments, the PSF pattern includes a center point and multiple center circles, and the plurality of PSFs are located at a lattice point where multiple horizontal lines and multiple vertical lines are located inside an outermost center circle among the center circles. Some embodiments provide that estimating the PSF includes determining step responses of vertical lines of the PSF pattern with respect to a vertically oriented edge of the out-of-focus input image. In some embodiments, estimating the PSF includes performing image convolution on the edge of the out-of-focus input image and each line of the PSF pattern and calculating the step responses including an intensity of the center point or intensities of the center circles as factors. Operations may also include determining the intensities of the center point and the center circles of the PSF pattern from the step responses and calculating estimation values of the PSFs belonging to the PSF pattern from the intensities of the center point and the center circles.

Some embodiments provide that the step responses are determined by having the intensity of the center point or the intensities of the center circles as factors if the PSFs are located at the center point or in the center circles, and by having an intensity of an adjacent center point or intensities of multiple adjacent center circles as factors, if the PSFs are not located at the center point or in the center circles.

In some embodiments, determining the intensities includes, when a matrix A includes factors with respect to the intensity of the center point or the intensities of the center circles of each of the step responses for lines of the PSF pattern, and a vector r corresponds to the intensities of the center point and the center circles, and a vector s corresponds to the step responses, calculating the intensities of the center point and the center circles according to an equation $Ar=s$.

Some embodiments provide that determining the intensities includes obtaining a pseudo inverse matrix $A^+$ with respect to the matrix A, and calculating the intensities of the center point and the center circles according to an equation $r=A^+s$. Some embodiments provide that calculating the estimation values includes, if the plurality of PSFs are located in the center point or the center circles, estimating the intensity of the center point or the intensities of the center circles as the corresponding PSF, and, if the PSFs are not located in the center point or the center circles, estimating the average value of the intensities of the adjacent center point or the adjacent center circles as the corresponding PSF.

In some embodiments, restoring the out-of-focus input image includes de-convoluting the out-of-focus input image and the estimated PSF and performing digital focus correction on the out-of-focus input image.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Figure 1:
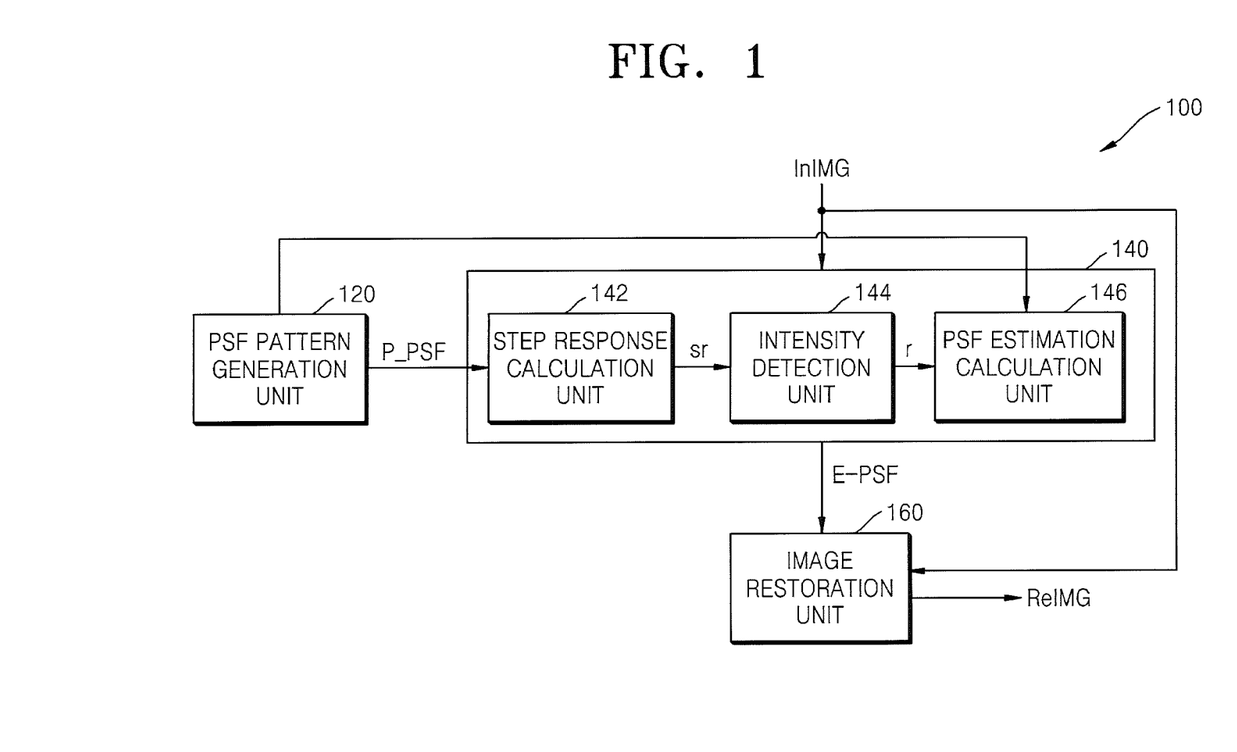
FIG. 1 is a block diagram of an image processing apparatus according to some embodiments of the inventive concept.

FIG. 1 is a block diagram of an image processing apparatus 100 according to some embodiments of the inventive concept.

Referring to FIG. 1, the image processing apparatus 100 may include a point spread function (PSF) pattern generation unit 120, a PSF estimation unit 140, and an image restoration unit 160. The PSF pattern generation unit 120 generates a PSF pattern P_PSF for estimating a PSF used to restore an out-of-focus input image InIMG. The PSF is a function of a distribution of the amount of light obtained from a surface on which an image is formed when an input of a point passes through an optical system (lenses, etc.) The PSF estimation unit 140 estimates the PSF indicating a degree of out-focusing or blurring of the out-of-focus input image InIMG. The image restoration unit 160 restores the out-of-focus input image InIMG using the estimated PSF E_PSF. That is, the image restoration unit 160 restores the out-of-focus input image InIMG to the focused image ReIMG.

Figure 2:
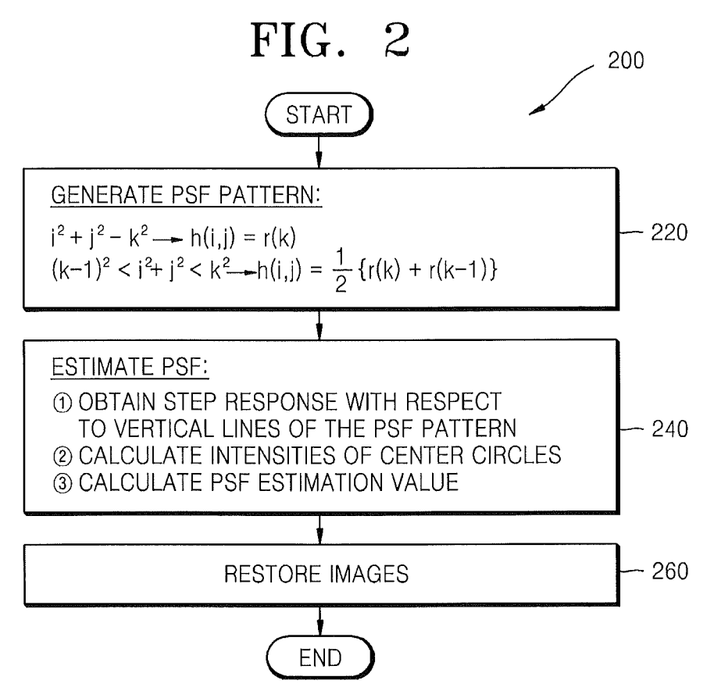
FIG. 2 is a flowchart of an image processing method according to some embodiments of the inventive concept.

FIG. 2 is a flowchart of an image processing method 200 according to some embodiments of the inventive concept.

Referring to FIG. 2, the image processing method 200 of the present embodiment includes an operation 220 of generating a PSF, an operation 240 of estimating the PSF, and an operation 260 of restoring an image.

The image processing apparatus 100 and the image processing method 200 of the present embodiment will now be described in more detail. The input image InIMG of the image processing apparatus 100 may be out-of-focus or blurred since a light reflected (emitted) from a point (a point light source) of a subject is not captured as a point of an image sensor (not shown). The degree of out-focusing or blurring is uniformly distributed according to a shape of an isotropy circle of confusion (COC) about a focus.

Therefore, in order to focus (restore) the out-of-focus input image InIMG, the degree of out-focusing is determined. As described above, the degree of out-focusing of the input image InIMG is determined by estimating the PSF.

Figure 3:
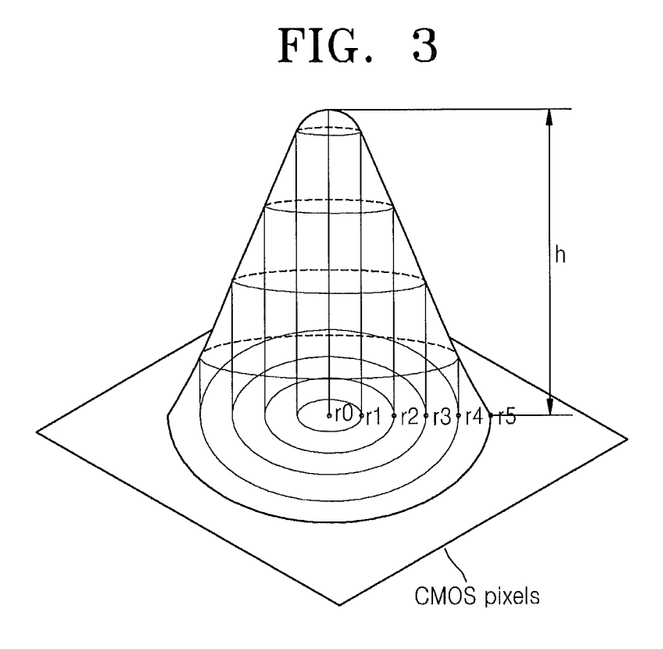
FIG. 3 is a conceptual diagram of a point spread function (PSF)

FIG. 3 is a conceptual diagram of a PSF h.

Referring to FIG. 3, an estimated value of the PSF h with respect to a point (pixel) of the input image InIMG is obtained by calculating intensities of a center point r0 and center circles r1~r5 with respect to pixels of the input image InIMG. The intensities of a center point r0 and center circles r1~r5 may be represented by an amount of light.

Figure 4:
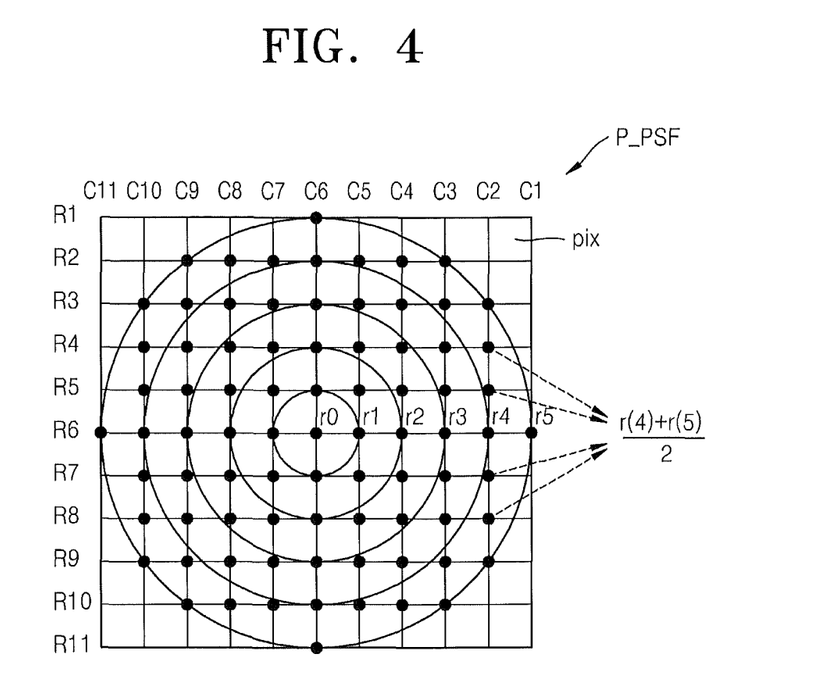
FIG. 4 is a diagram for explaining a PSF pattern generated by a PSF pattern generation unit of FIG. 1, according to some embodiments of the inventive concept.

FIG. 4 is a diagram for explaining a PSF pattern P_PSF generated by the PSF pattern generation unit 120 of FIG. 1 according to some embodiments of the inventive concept.

Referring to FIG. 4, the PSF pattern generation unit 120 of the present embodiment establishes the PSF pattern P_PSF so that a plurality of PSFs (shown in dots) are located on or within an outermost center circle r5, and on lattice points of vertical lines C1~C11 and horizontal lines R1~R11. The PSF pattern generation unit 120 establishes the PSF pattern P_PSF so that the PSFs are symmetrical to each other in four directions. In particular, the PSF pattern P-PSF are characterized as the center point r0 and the center circles (circles of confusion) r1~r5. A single square blank pix may correspond to a single pixel of the input image InIMG.

According to some embodiments, if the PSF is located on the center point r0 or the center circles r1~r5 of the PSF pattern P_PSF, the PSF is estimated as intensities of the center circles r1~r5. Meanwhile, if the PSF is not located on the center point r0 or the center circles r1~r5 of the PSF pattern P_PSF, the PSF is estimated as an intensity of an adjacent center point or an average of the intensities of the center circles r1~r5.

It is assumed that r(0) denotes an intensity of a center point, and r(k) denotes intensities of center circles. In the PSF pattern P_PSF, k may be 1, 2, 3, 4, or 5. The PSF located on a center circle 5 r5 is r(5). The PSF located between the center circle 5 r5 and a center circle 4 r4 is (r(5)+r(4))/2. The PSF may be expressed as (h(i,j)) based on an algorithm which is shown below, using a vertical direction location i and a horizontal direction location j according to the image processing apparatus 100 and the image processing methods 200 as disclosed herein,

---

[Algorithm]

For $i, j = -R, \ldots, 0, \ldots, R$

For $k = 0, \ldots, R$

If $i^2 + j^2 = k^2$, then $h(i, j) = r(k)$

Else if $(k-1)^2 < i^2 + j^2 < k^2$, then $h(i, j) = \frac{1}{2}\{r(k) + r(k-1)\}$

--- r(k) denotes an intensity of a center point or intensities of center circles. R denotes the number of center circles (R is an integer number greater than 1). If a vertical direction location i and a horizontal direction location j of the center point is (0,0), the vertical direction location i and the horizontal direction location have j values between −R and R.

As shown in the algorithm above, according to the image processing apparatus 100 and the image processing methods 200, if the PSF is located on the center point or the center circles ($i^2+j^2=k^2$) the PSF is estimated as r(0) or r(k) that is the intensity of the center point or intensities of center circles. Meanwhile, if the PSF is not located on the center point or the center circles ($(K-1)^2<i^2+j^2<k^2$), the PSF is estimated as the average value of the intensities of the adjacent center point r0 or the adjacent center circles ({r(k)+r(k−1)}/2).

According to the image processing apparatus 100 and the image processing method 200 of embodiments described herein, the intensity of the center point r0 or the intensities of the center circles r1~r5 may be calculated in order to estimate the PSF. A method of calculating the intensity of the center point r0 or the intensities of the center circles r1~r5 will now be described in more detail.

Figure 5:
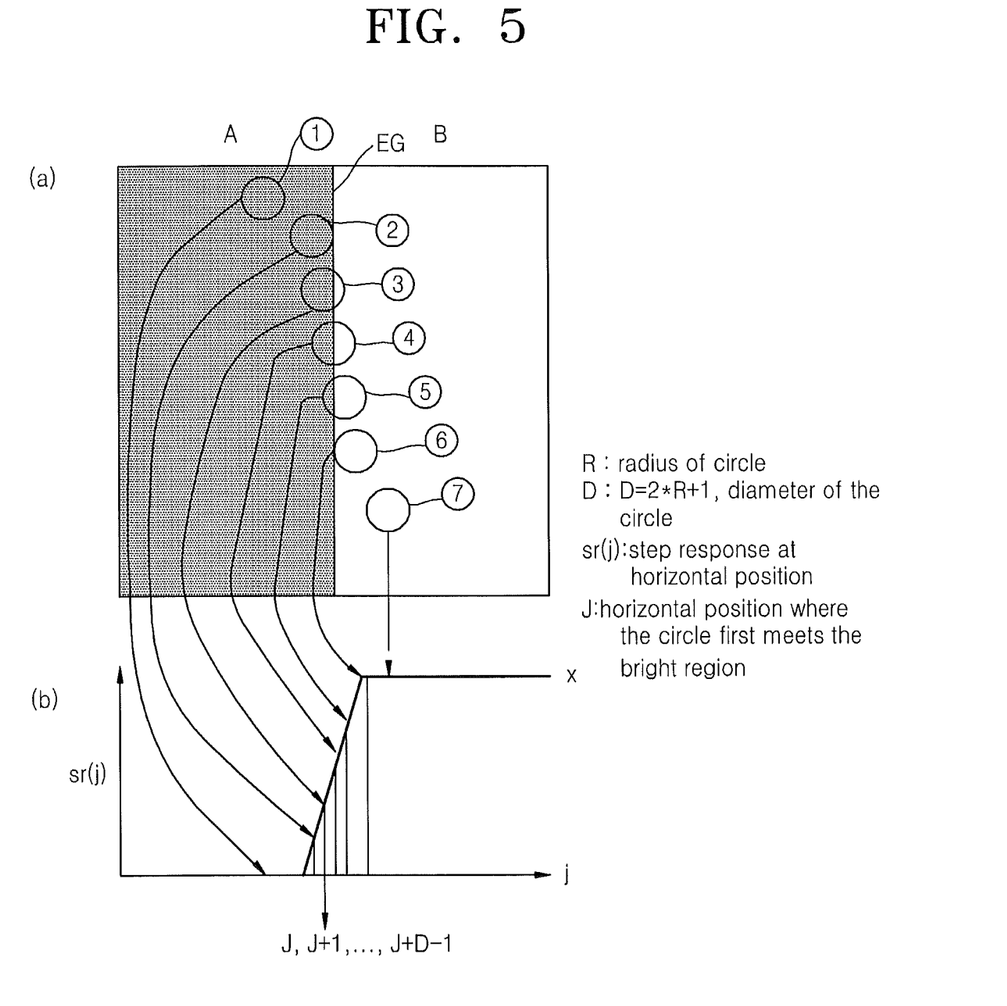
FIGS. 5 and 6A through 6D are diagrams for explaining a step response calculation unit of FIG. 1, according to some embodiments of the inventive concept.

A step response calculation unit 142 calculates a step response sr with respect to an edge of the input image InIMG. Referring to FIGS. 5 and 6, the step response calculation unit 142 scans (in an arrow direction of FIG. 6) the PSF pattern P_PSF from a dark area A of the input image InIMG including a vertical direction edge EG to a bright area B thereof, and performs image convolution on the PSF pattern P_PSF and the input image InIMG including the vertical direction edge EG. That is, when the horizontal lines C1~C11 of the PSF patterns P_PSF (as illustrated in FIG. 4) are located in the vertical direction edge EG of the input image InIMG, the step response (S(J)~S(J+D−1(=11))) is calculated. Although the dark area A may be darker than shown in section (a) of FIG. 5, the dark area A is shown slightly lighter in order to show the content included therein.

The enumerated circles illustrated in FIG. 5 represent the PSF pattern P_PSF through the sequence of periods in the image convolution. When the PSF pattern P_PSF is located in the dark area A (period 1 of FIG. 5 and FIG. 6A), a convolution value is maintained as "0". The convolution value starts increasing after the vertical line 1 C1 of the PSF pattern P_PSF first meets the vertical direction edge EG (period 2 of FIG. 5 and FIG. 6B). The convolution value increases during periods 3 through 6 when the PSF pattern P_PSF moves from the vertical direction edge EG to the bright area B. If the PSF pattern P_PSF is completely located in the bright area B (period 7 of FIG. 5A and FIG. 6D), the convolution value is maintained at a predetermined value x.

A method of calculating a step response sr(j) will now be described with reference to FIG. 6B.

Figure 6A:
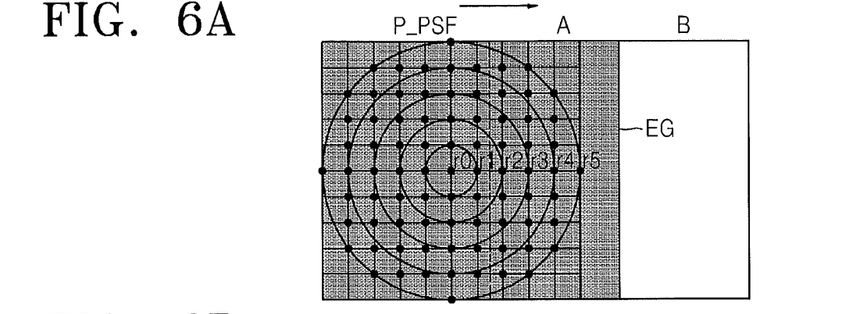
Figure 6B:
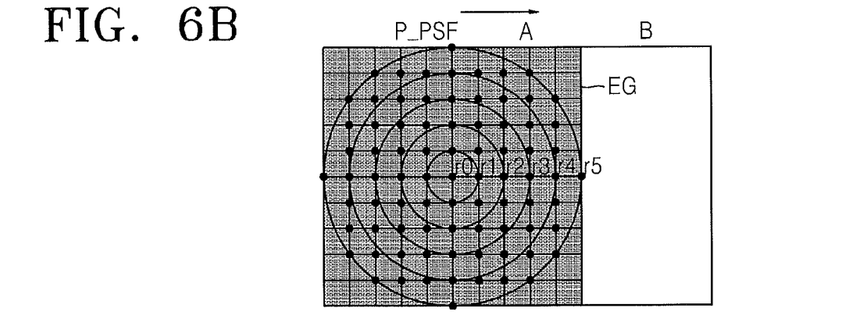

Referring to FIG. 4 and FIG. 6B, a PSF at which the vertical direction edge EG first meets the PSF pattern P_PSF is located in a lattice point (intersection point) of the vertical line C1 and the horizontal line R6 of the PSF pattern P_PSF. If J of FIG. 5 denotes a horizontal direction location where the vertical direction edge EG first meets the PSF pattern P_PSF, the step response sr(j) with respect to the vertical line C1 is expressed below.

$$Sr(J)=r(5) \quad \text{[Equation 1]}$$

Figure 6C:
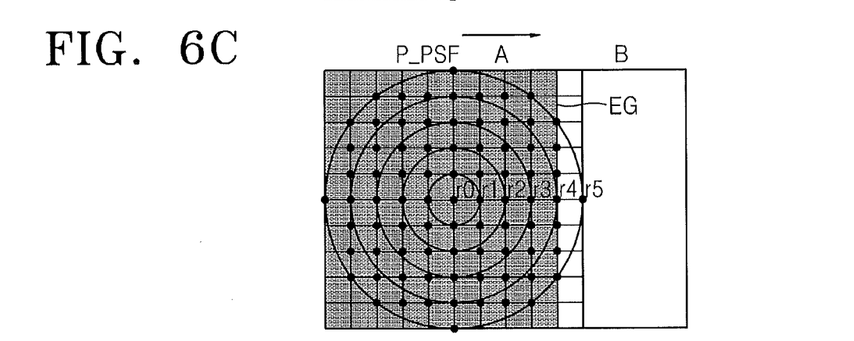

Referring to FIG. 6C, after the vertical line C1 of the PSF pattern P_PSF meets the vertical direction edge EG of the input image InIMG, if the vertical line C1 moves by a single pixel in an arrow direction, the vertical line 2 C2 of the PSF pattern P_PSF meets the vertical direction edge EG of the input image InIMG. A step response sr(J+1) with respect to the vertical line C2 of the PSF pattern P_PSF is expressed below.

$$sr(J+1)=s(J)+[2r(5)+4(r(5)+r(4))/2+r(4)]=3r(4)+5r(5) \quad \text{[Equation 2]}$$

In Equation 2, two of seven PSFs located at the vertical line C2 are located in a center circle r5, four thereof are located between the center circle r5 and the center circle r4, and the other one is located in the center circle r4. As described above, if the PSF is located on a center point or center circles ($i^2+j^2=k^2$), the PSF is estimated as r(0) or r(k), that is, the intensity of the center point or intensities of center circles. Meanwhile, if the PSF is not located on the center point or the center circles ($(K-1)^2<i^2+j^2<k^2$), the PSF is estimated as the average value of the intensities of the adjacent center point r0 or the adjacent center circles ({r(k)+r(k−1)}/2).

Therefore, step responses with respect to the vertical line C3 through the vertical line C11 of the PSF pattern P_PSF may be obtained with reference to Equations 1 and 2. For example, the vertical line C3 may be obtained by adding values of two PSFs located in the center circle r5, two PSFs located between the center circle r5 and the center circle r4, four PSFs located between the center circle r4 and the center circle r3, and one PSF located in the center circle r3 in the step response sr(J+1) with respect to the vertical line C2 of the PSF pattern P_PSF.

Figure 6D:
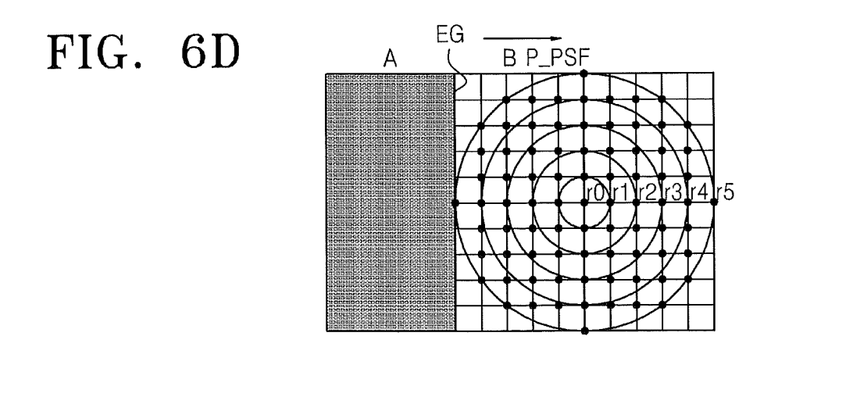

In the manner stated above, referring to FIG. 6D, the PSF pattern P_PSF moves by a single pixel in the arrow direction, and performs image convolution on the input image InIMG according to a left outermost vertical line (the vertical line C11). As a result, eleven step responses sr(J)~sr(J+10) with respect to the vertical lines C1~C11 of the PSF pattern P_PSF are calculated as listed in a table of FIG. 7.

Figure 7:
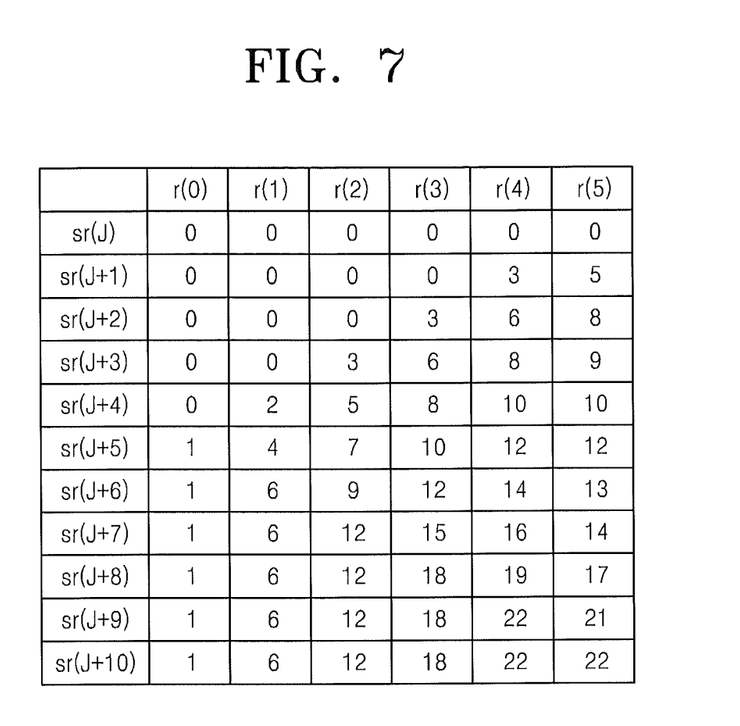
FIG. 7 is a table of step responses calculated by the step response calculation unit of FIG. 1, according to some embodiments of the inventive concept.

For example, referring to FIG. 7, the step response sr(J) is for the vertical line C1 of the PSF pattern P_PSF, the step response sr(J+1) is for the vertical line C2 of the PSF pattern P_PSF, and the step response sr(J+2) is for the vertical line C3 of the PSF pattern P_PSF.

If the table regarding the step responses sr(J)~sr(J+10) having an intensity of a center point or intensities of center circles as factors is determined as shown in FIG. 7, an intensity detection unit 144 of the PSF estimation unit 140 may obtain the intensity of the center point r0 and the intensities of the center circles r1~r5 of the PSF pattern P_PSF by calculating a value of the following linear equation. That is, in Equation 3, since a vector s with respect to a step response and a matrix A with respect to the table of FIG. 7 are determined, a vector r with respect to the intensities of the center point r0 and the center circles r1~r5 can be calculated.

$$Ar=s \qquad \text{[Equation 3]}$$

D denotes a diameter of the PSF pattern P_PSF, and R denotes the number of center circles included in the PSF pattern P_PSF, A denotes a matrix Dx(R+1) including elements having the same value as shown in the table of FIG. 7, r denotes a vector (R+1)×1 with respect to intensities of center circles, and s denotes a vector Dx1 with respect to step responses. In the PSF pattern P_PSF, D(~2R+1,R=5) is 11.

The intensity detection unit 144 may factorize the matrix Dx(R+1) A using a singular value decomposition (SVD) according to the following Equation 4, $$A=USV^T \qquad \text{[Equation 4]}$$

U denotes an orthogonal matrix D×D, S denotes a rectangular matrix Dx(R+1) in which elements located in a diagonal line are not "0", and V denotes an orthogonal matrix (R+1)×(R+1). The SVD may be extended to a complex field in which a term of an orthogonal matrix is substituted as a unit matrix. A matrix transpose $^T$ may be substituted as a conjugate transpose. Therefore, a pseudo inverse matrix $A^+$ of A is calculated according to Equation 5, $$A^+=VS^+U^T \qquad \text{[Equation 5]}$$

$S^+$ denotes a matrix transpose of S having entries other than all 0.

By using Equations 3 and 5, a vector $r=[r(0), \ldots, r(k))]^T$ with respect to the intensities of the center point and the center circles is calculated according to Equation 6 below, $$r=A^+s \qquad \text{[Equation 6]}$$

Referring to FIG. 1 again, the PSF estimation calculation unit 146 of the PSF estimation unit 140 estimates the PSF by substituting r of Equation 6 with the above algorithm. That is, if the PSF is located on the center point or the center circles ($i^2+j^2=k^2$), the PSF is estimated as r(0) or r(k), that is, the intensity of the center point or intensities of center circles.) Meanwhile, if the PSF is not located on the center point or the center circles ($(K-1)^2<i^2+j^2<k^2$), the PSF estimation calculation unit 146 estimates the PSF as the average value of the intensities of the adjacent center point r0 or the adjacent center circles ($\{r(k)+r(k-1)\}/2$).

Figure 8A:
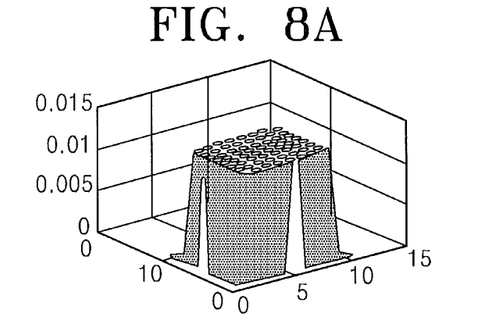
FIGS. 8A through 8E are diagrams for comparing an input image with an image restored using an image processing apparatus and an image processing method, according to some embodiments of the inventive concept.

The estimated PSF E_PSF is shown in FIG. 8A.

Figure 8B:
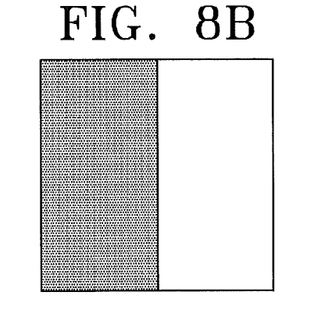
Figure 8C:
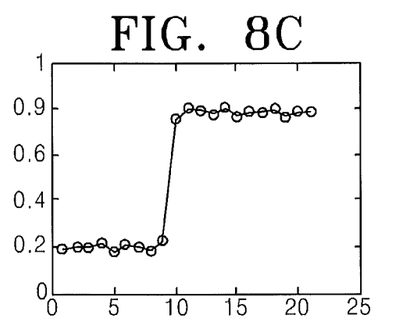
Figure 8D:
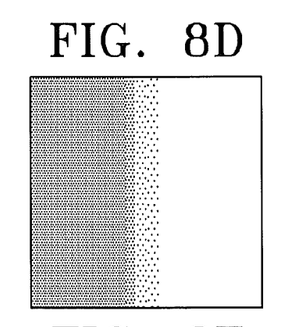
Figure 8E:
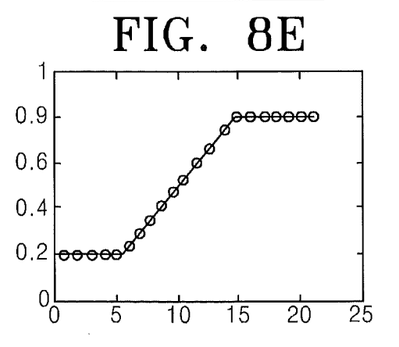

The image restoration unit 160 restores the input image InIMG using the estimated PSF E_PSF. For example, the image restoration unit 160 may de-convolute the estimated PSF E_PSF shown in FIG. 8A with the input image InIMG, and output a restored image ReIMG shown in FIG. 8B. Upon comparing the restored image ReIMG with the out-of-focus input image InIMG and a step response thereof shown in FIG. 8E, the restored image ReIMG may have an ideal step response as shown in FIG. 8C.

As described above, the image processing apparatus 100 and the image processing method 200 of the present embodiment may perform image convolution on line units of a special PSF pattern with an input image and obtain an ideal step response. The ideal step response is used to estimate a PSF, thereby easily and accurately estimating the PSF.

Figure 9:
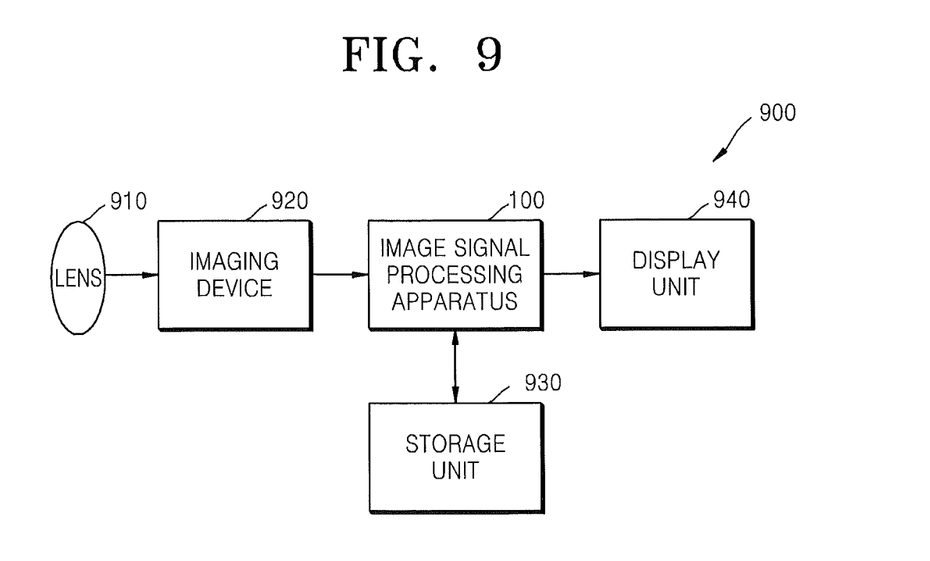
FIG. 9 is a block diagram of an image system including the image processing apparatus of FIG. 1, according to some embodiments of the inventive concept.

FIG. 9 is a block diagram of an image system 900 including the image processing apparatus 100, according to some embodiments of the inventive concept.

Referring to FIG. 9, the imaging system 900 may include a lens 910, an imaging device 920, and the image signal processing apparatus 100. The imaging system 900 may further include a storage unit 930 and a display unit 940.

The imaging device 920 may capture an image of an object (not shown), generate image signals of the captured image, and output the generated image signals to the image signal processing apparatus 100. The imaging device 920 may be embodied as a complementary metal-oxide semiconductor (CMOS) image sensor (CIS), a charge-coupled device (CCD), etc. The pixel array of the imaging device 920 may be, e.g., an active pixel sensor (APS) array in which a million or more pixels are arranged. The imaging device 920 may generate image signals including R, G, and B by capturing an image of an object (not shown) using photodiodes included in each of pixels of the APS array. Three types of color filters, e.g., R, G, B, may be arranged, e.g., in the form of a Bayer pattern, on the top of each pixel constituting the APS array, so that light of predetermined colors may be incident thereto. In such cases, image signals output by the imaging device 920 may have a Bayer pattern.

The image signal processing apparatus 100 shown in FIG. 9 may be a general image signal processor (ISP), and may include the PSF pattern generation unit 120, the PSF estimation unit 140, and the image restoration unit 160.

The image processing apparatus 100 may perform at least one of an interpolation process, a gamma correction process, an edge enhancement process, auto exposure (AE) control, auto white balance (AWB) control, and digital zoom, in addition to the function of the image restoration unit 160.

The lens 910 may be arranged between an object (not shown) and the imaging device 920. The lens 910 may refract an image of the object transmitted to the imaging device 920. In some embodiments, the lens 910 of the imaging system 900 may be an extended depth of focus (EdoF) lens.

The storage unit 930 may receive an image signal output by the image processing apparatus 100 and may store the received image signal. The image signal output by the image processing apparatus 100 may be compressed in a format, such as the joint photographic expert group (JPEG) format or the motion picture experts group (MPEG) format, before being stored in the storage unit 930. The storage unit 930 of the imaging system 300 may be, e.g., a general memory device, such as a dynamic random access memory (DRAM), a flash memory, etc.

The display unit 940 may receive the image signal output by the image processing apparatus 100 and may display the image signal on a screen. An image signal output by the image processing apparatus 100 may be output to the display unit 940 after resolution conversion. The display unit 940 of the imaging system 900 may be a general display device, e.g., a liquid crystal display (LCD).

An imaging system employing one or more aspects described herein, e.g., the imaging system 900, may be included, e.g., in a camera module for a mobile phone camera, a digital still camera, etc.

While the inventive concept has been particularly shown and described with reference to exemplary embodiments thereof, it will be understood that various changes in form and details may be made therein without departing from the spirit and scope of the following claims.

What is claimed is:

1. An image processing apparatus comprising:
a point spread function (PSF) pattern generation unit that is configured to generate a PSF pattern in which a plurality of PSFs are located in a plurality of lines of the PSF pattern;
a PSF estimation unit that is configured to estimate at least one of the plurality of PSFs of an out-of-focus input image from at least one of a plurality of step responses of respective ones of the plurality of lines of the PSF pattern with respect to an edge of the out-of-focus input image; and an image restoration unit that is configured to restore the out-of-focus input image to a focused restored image using the estimated PSF, wherein at least one of the PSF pattern generation unit, the PSF estimation unit and the image restoration unit comprise an image signal processor, wherein the PSF pattern includes a center point and a plurality of center circles, wherein the plurality of PSFs are located at a lattice point where a plurality of horizontal lines and a plurality of vertical lines are located inside an outermost center circle among the plurality of center circles, wherein, responsive to the plurality of PSFs being located in the center point or the plurality of center circles, the PSF estimation unit estimates an intensity of the center point and/or intensities of the center circles as the corresponding PSF, and, responsive to the plurality of PSFs not being located in the center point or the plurality of center circles, the PSF estimation unit estimates the average value of the intensities of an adjacent center point or adjacent center circles as the corresponding PSF, and wherein, responsive to a matrix A having factors corresponding to the intensity of the center point and/or the intensities of the center circles of each of the step responses for lines of the PSF pattern in a direction, a vector for the intensities of the center point and the center circles is r, and a vector for the step responses is s, an intensity calculation unit calculates the intensities of the center point and the center circles according to an equation $Ar=s$.

2. The image processing apparatus of claim 1, wherein the PSF pattern includes the plurality of PSFs arranged diagonal to each other in four directions with respect to a centered horizontal line among the plurality of horizontal lines and a centered vertical line among the plurality of vertical lines.

3. The image processing apparatus of claim 1, wherein the PSF estimation unit is configured to determine step responses of vertical lines of the PSF pattern with respect to a vertically oriented edge of the out-of-focus input image.

4. The image processing apparatus of claim 1, wherein the PSF estimation unit comprises:
a step response calculation unit that is configured to performing image convolution on the edge of the out-of-focus input image and each line of the PSF pattern and to calculate the step responses including an intensity of the center point and/or intensities of the plurality of center circles as factors;
the intensity calculation unit that is configured to determine the intensities of the center point and the plurality of center circles of the PSF pattern from the step responses; and
a PSF estimation value calculation unit that is configured to calculate estimation values of the plurality of PSFs belonging to the PSF pattern from the intensities of the center point and the plurality of center circles calculated by the intensity calculation unit.

5. The image processing apparatus of claim 4, wherein the step responses are determined by using the intensity of the center point and/or intensities of the plurality of center circles as factors if the plurality of PSFs are located in the center point and/or the plurality of center circles, and by using an intensity of an adjacent center point and/or intensities of a plurality of adjacent center circles as factors, if the plurality of PSFs are not located in the center point and/or the plurality of center circles.

6. The image processing apparatus of claim 1, wherein the intensity calculation unit determines a pseudo inverse matrix $A^+$ with respect to the matrix A, and calculates the intensities of the center point and the center circles according to an equation $r=A^+s$.

7. The image processing apparatus of claim 1, wherein the image restoration unit de-convolutes the out-of-focus input image and the estimated PSF and performs digital focus correction on the out-of-focus input image.

8. An image system comprising:
an imaging device that is configured to capture an image of an object through a lens, and to generate an image signal of the captured image;
an image processing apparatus that is configured to receive the image signal from the imaging device and to process the image signal; and
a display unit that is configured to display the processed image signal,
wherein the image processing apparatus comprises:
a point spread function (PSF) pattern generation unit that is configured to generate a PSF pattern in which a plurality of PSFs are located in a plurality of lines of the PSF pattern;
a PSF estimation unit that is configured to estimate PSFs of an out-of-focus input image from step responses of the plurality of lines of the PSF pattern with respect to an edge of the out-of-focus input image; and
an image restoration unit that is configured to restore the out-of-focus input image to a focused restored image using the estimated PSF,
wherein at least one of the PSF pattern generation unit, the PSF estimation unit and the image restoration unit comprise an image signal processor,
wherein the PSF pattern includes a center point and a plurality of center circles, wherein the plurality of PSFs are located at a lattice point where a plurality of horizontal lines and a plurality of vertical lines are located inside an outermost center circle among the plurality of center circles,
wherein the PSF estimation unit comprises a step response calculation unit that is configured to perform an image convolution on the edge of the out-of-focus input image and each line of the PSF pattern and to calculate the step responses including an intensity of the center point and/or intensities of the plurality of center circles as factors, and
wherein, responsive to a matrix A having factors corresponding to the intensity of the center point and/or the intensities of the center circles of each of the step responses for lines of the PSF pattern in a direction, a vector for the intensities of the center point and the center circles is r, and a vector for the step responses is s, an intensity calculation unit calculates the intensities of the center point and the center circles according to an equation $Ar=s$.

* * * * *